(12) United States Patent
Goodson et al.

(10) Patent No.: US 6,170,436 B1
(45) Date of Patent: Jan. 9, 2001

(54) BY-CATCH REDUCTION ACOUSTIC DEVICE

(75) Inventors: Anthony David Goodson; Bryan Woodward, both of Loughborough; Darryl Newborough, Swadlincote, all of (GB)

(73) Assignee: Loughborough University Innovations Ltd, Loughborough (GB)

( * ) Notice: Under 35 U.S.C. 154(b), the term of this patent shall be extended for 0 days.

(21) Appl. No.: 09/214,891

(22) PCT Filed: Jul. 18, 1997

(86) PCT No.: PCT/GB97/01976

§ 371 Date: Sep. 2, 1999

§ 102(e) Date: Sep. 2, 1999

(87) PCT Pub. No.: WO98/03062

PCT Pub. Date: Jan. 29, 1998

(30) Foreign Application Priority Data

Jul. 19, 1996 (GB) .................................................. 9615237
Aug. 6, 1996 (GB) .................................................. 9616559

(51) Int. Cl.$^7$ .......................... A01K 61/00; A01K 73/02; A01K 79/02; H04B 1/02
(52) U.S. Cl. .................. 119/220; 43/9.2; 43/9.6; 43/17.1; 367/139
(58) Field of Search .................. 43/4.5, 9.2, 9.1, 43/9.6, 17.1; 367/139, 137, 135; 119/220

(56) References Cited

U.S. PATENT DOCUMENTS

| | | | |
|---|---|---|---|
| Re. 30,841 | * | 1/1982 | Ramberg et al. ................ 73/862.39 |
| 3,757,286 | * | 9/1973 | Richard ................................ 340/566 |
| 4,769,794 | * | 9/1988 | Beuter et al. ....................... 367/139 |
| 4,932,007 | * | 6/1990 | Suomala ............................... 367/139 |
| 4,945,520 | * | 7/1990 | Ford ..................................... 367/191 |
| 4,965,552 | * | 10/1990 | Price et al. .......................... 340/566 |
| 4,992,988 | * | 2/1991 | Koehler et al. ..................... 367/135 |
| 5,117,572 | * | 6/1992 | Parra ..................................... 43/17.1 |
| 5,134,592 | * | 7/1992 | Parra ..................................... 367/139 |
| 5,251,187 | * | 10/1993 | Parra ..................................... 367/139 |
| 5,291,682 | * | 3/1994 | Zaccheo ................................ 43/17.1 |
| 5,343,442 | * | 8/1994 | Vielberth ............................. 367/139 |
| 5,349,774 | * | 9/1994 | Parra ....................................... 43/9.2 |
| 5,377,163 | * | 12/1994 | Simpson .............................. 367/131 |
| 5,448,968 | * | 9/1995 | Ostlie .................................... 119/220 |
| 5,461,815 | * | 10/1995 | Rodgers ................................ 43/17.6 |
| 5,559,759 | * | 9/1996 | Gerstein et al. .................... 367/139 |
| 5,570,322 | * | 10/1996 | Miller .................................. 367/107 |
| 5,610,876 | * | 3/1997 | Jeffers ................................. 367/139 |
| 5,627,801 | * | 5/1997 | Saunders ............................. 367/139 |
| 5,644,863 | * | 7/1997 | Vergurg ................................... 43/9.6 |
| 5,668,778 | * | 9/1997 | Quazi .................................. 367/135 |
| 5,774,088 | * | 6/1998 | Kreithen ................................ 342/22 |
| 5,778,591 | * | 7/1998 | Oschman et al. .................... 43/17.1 |
| 5,850,372 | * | 12/1998 | Blue ..................................... 367/139 |
| 6,016,100 | * | 1/2000 | Boyd et al. ........................ 340/384.2 |

FOREIGN PATENT DOCUMENTS

| | | | |
|---|---|---|---|
| 2091043 | * | 9/1994 | (CA) . |
| 2074319 | * | 4/1980 | (GB) . |
| 4-079822 | * | 3/1992 | (JP) . |
| 300477 B1 | * | 1/1994 | (NO) . |
| 720 391 | * | 3/1980 | (SU) . |
| 1618363 | * | 1/1991 | (SU) . |
| WO 98/03061 A1 | * | 1/1998 | (WO) . |

* cited by examiner

*Primary Examiner*—Michael J. Carone
*Assistant Examiner*—Fredrick T. French, III
(74) *Attorney, Agent, or Firm*—James E. Bradley; Felsman, Bradley, Vaden, Gunter & Dillon LLP

(57) ABSTRACT

Acoustic devices, attached to fishing nets, reduce or avoid by-catch of marine animals during fishing operations. The acoustic devices emit a deterrent signal to a particular marine animal on actuation by the approach of the animal. At least one of the devices is an active device that detects marine animal emitted stimuli and responds with a suitable response emission.

28 Claims, 3 Drawing Sheets

BY-CATCH REDUCTION ACOUSTIC DEVICE

This invention relates to methods of and apparatus for reducing or avoiding the by-catch of marine mammals during fishing operations.

Nets, especially gill-nets, are essentially large transparent diffuse structures and difficult to perceive for dolphins and other small cetaceans, though fish trapped in such or behind nets can be detected by the animal's sonar, and the animal's pursuit of prey may result in its own entrapment in the net. This by-catch is problematical especially where a species is already endangered or where mortality rates are recognised as excessive. In this context harbour porpoise by-catch in bottom set gill-nets is a particular problem.

Various measures have been suggested and some even tried to prevent or reduce such by-catch. The methods fall into two categories i) Passive enhancement of the acoustic reflecting properties of the net.

ii) Active acoustic alarms or beacons intended to warn or scare away the animals at risk.

Category i) passive experiments involving modification of the net fibre material or the addition of assorted materials, i.e. 'bead chain' attached to the structure have shown very little benefit.

Category ii) active devices may be treated as low power beacons or alarms which act as 'lighthouses' to mark the position of the net obstruction or as very high power acoustic harassment devices (AHDs) which are intended to create an uncomfortable exclusion zone immediately surrounding them. AHD devices with source levels which may approach 210 dB re 1 $\mu$Pa at 1 m in seawater, are typically applied to protect static fish farm facilities from pinniped predation and may require an electricity generator or a direct connection to shore power.

To be cost effective, deterrent devices must be inexpensive both to deploy and to run, and they must remain effective for reasonable periods of time. Active devices require very high electro-acoustic efficiency to maximise their operating life on batteries (and minimise the down-time needed for battery replacement). However, effectiveness must also take into account the rate at which animals may habituate to, learn to ignore or take advantage from the emitted sounds.

Active 'pinger' beacon or alarm devices typically comprise a waterproof pressure housing attachable to the net which contains a power source (usually conventional dry cells) and an acoustic signal generator, typically generating a 'ping' around 10 kHz with an acoustic output around 120–140 dB re 1 $\mu$Pa at 1 m in seawater. The frequency is chosen to be audible to the cetacean but inaudible to the fish. However, the long term effectiveness of this approach is unknown.

The present invention, however, provides methods and devices having significant advantages both from a cost-effectiveness point of view and from the point of view of their absolute effectiveness in deterring specific marine mammals or alerting them to the nets so that they are able to avoid them.

The invention in one aspect comprises a method for reducing or avoiding by-catch of marine mammals during fishing operations using nets comprising disposing on or in relation to the nets a series or array of acoustic devices which emit a deterrent signal appropriate to a particular marine mammal on actuation by the approach of the mammal in question.

The acoustic devices may comprise active sensors that detect marine mammal emitted stimuli and respond with a suitable response emission. They may be arranged so as not to be triggered by their own back-scattered emission, and, further, arranged each to trigger an adjacent device to produce a ripple-effect response to a detected marine mammal stimulus.

The response emission may include acoustic emissions at different frequencies, which may be emitted at different times during a single emission period (e.g. by ramping a single frequency up or down over a period) or at the same time (e.g. by emission of multiple tones or harmonics).

Different response emissions may be emitted depending on the detected marine mammal stimuli. The devices may emit different responses from a set of stored responses, and may emit more than one response from the set in response to a particular stimulus.

The devices may detect the effect of response emission and adapt the emissions so as to improve or optimise their effect. The devices may for example detect reduction in emitted stimuli, such reduction reinforcing selection of particular response emissions that effect such reduction.

It is also possible, however, to use passive devices, comprising discrete acoustic reflectors capable of returning an echo directly back towards an echolocating marine mammal. The unsatisfactory passive devices tested to date have utilised materials with cross-sections significantly smaller than the shortest wavelength of the ensonifying signal transmitted by the marine mammal. In such cases the incident energy is scattered inefficiently or directed away from the animal. According to this invention discrete passive reflectors have minimum cross-sections exceeding 3 times the short wavelengths exploited by echolocating small cetaceans and are constructed with a shape which ensures that significant echo energy is returned directly towards the animal.

An ellipsoidal deep water net float, designed with a suitably shaped air cavity, has the required target strength characteristics, i.e. its echoes must appear slightly 'brighter' than those from the largest fish sought as prey by the cetacean at risk, but according to the invention, must be deployed with its long axis in the vertical plane and be disposed in a series or array in which their acoustic properties, rather than the flotation properties, are utilised. In addition these floats are modified to have neutral buoyancy so as to produce least distortion to the geometry of the net to which they are attached. Further, the internal air cavity of the float has an acoustic resonance selected to provide a spectral echo 'signature' when ensonified which is detectable to the animal and very uncharacteristic of a typical prey echo. This resonant acoustic signature can also be stimulated by suitable signals emitted by active alarm devices and hence extend the influence of these.

The invention also comprises an acoustic device adapted for attachment to a fishing net and comprising a detector for detecting acoustic signals and a transducer for emitting acoustic signals and signal generating means adapted to generate signals for emission by the transducer and control means adapted to cause the transducer to emit signals on detection of a signal by the detector.

The signal generating means may be programmable to generate pre-selected signals, and may generate Morse code.

The device may comprise device condition monitoring means and be adapted to emit condition information.

The device may be adapted to emit on detection of an echo sounder signal and/or a coded interrogation signal.

The device may comprise an immersion sensor, which may be a capacitative sensor, and which may condition the emission of signals by the device.

The device may be a device which is primarily adapted to emit warning or deterrent signals to marine mammals, and may be one adapted to detect marine mammal emitted signals and respond with a suitable response emission.

Methods for reducing or avoiding by-catch and acoustic devices therefore according to the present invention will now be described with reference to the accompanying drawings, in which.

Figure 1:
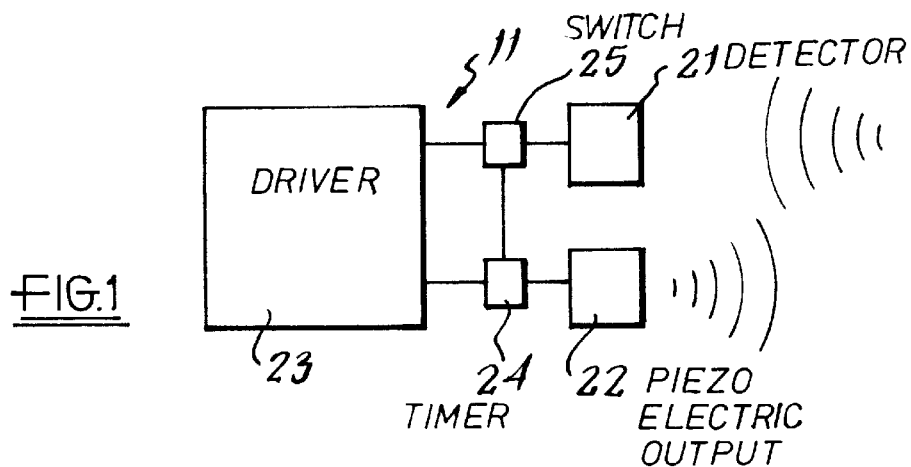
FIG. 1 is a block diagram of an acoustic device.

The drawings illustrates acoustic devices and methods using them for reducing or avoiding by-catch of marine mammals, particularly dolphins and porpoises but also small whales, pinnipeds, manatees and the like during fishing operations, particularly gill-net fishing, though also in other types of fishing, such as pelagic trawl or long-line fisheries.

Essentially, a series or array of acoustic devices 11 is disposed on or in relationship to the nets 12, 13 which devices 11 emit a deterrent sound appropriate to a particular marine mammal on actuation by the approach of the animal in question.

The approach of all animals is in principle detectable—marine mammals giving rise to the problem of by-catch are significantly larger than most of the fish with which they are caught. Mammals caught in gill-nets at or near the seabed are there to forage for prey and actively use their echolocation sense. Mammals at the surface when not in pursuit of prey may be travelling silently for a proportion of the time and may therefore require net marking devices which generate repeating beacon signals to alert them.

By-catch in fishing gear is also a problem for larger whales. (In the Mediterranean sea sperm whales are caught in drift nets set for swordfish; baleen whales entangle in both set nets and traps for capelin and cod off Newfoundland). Passive deterrents optimised for small cetaceans may also be partially effective at the sperm whale's much lower sonar frequencies and should directly stimulate the device cavity resonance. Baleen whales do not echolocate although their low frequency vocalisations may propagate over very long ranges. Simple active alarm devices transmitting at frequencies around 2 to 4 kHz have been shown to affect baleen whale behaviour and to reduce collisions with fishing gear.

Dolphins and porpoises are a substantial problem, but, on the other hand, are relatively easily detected from their sonar emissions. The acoustic devices 11 of FIGS. 1 and 2 comprise active devices that detect dolphin-or porpoise-emitted stimuli their sonar transmission—and respond to them with a suitable response emission.

These animals use their active sonar primarily to echolocate for their prey and may also employ this sense to navigate around obstacles. Nets, however, with the possible exception of the headline (headline floats) and footrope (leadline) components, form large diffuse structures that are essentially transparent to dolphin sonar. Passive reflectors might be mistaken for prey if they reflect sonar echoes with a similar spectral coloration to that of a fish. Active sound sources create an alien acoustic feature and will 'wake-up' and attract the animal's attention at a distance. At very short ranges the signal onset may become strong enough to induce aversive behaviour. In this context a sound which induces a 'fright' reaction may cause the animal to cease echolocation and 'run-silent'. This is not necessarily a beneficial reaction and excessive sound pressure levels are in general to be avoided.

A principle problem with conventional pingers, however, is that they are wasteful of power and require too-frequent battery changes. By operating primarily when an approach is detected a very low duty cycle beacon mode may suffice at other times, battery power being conserved and time between changes very considerably extended.

The active devices 11, as shown in FIG. 1, comprise a hydrophone detector 21 and a piezo electric output 22 with intermediate circuitry 23 driving the output 22 to emit the appropriate deterrent signal. (For some applications transducers 21 and 22 can be the same device).

Porpoise clicks are detectable in a narrow band at around 120–140 kHz, dolphin sonar over a much wider range centered around 100 kHz, both however, being within the range 70 kHz to 140 kHz in which ambient sea noise is a minimum. The input 21 is made sensitive to this frequency range. Alternatively, for more vocal species, the dolphin 'whistle' communication band between 4 kHz and 22 kHz may be utilised as a trigger.

The output signal is conveniently a pulsed signal at the resonance frequency of the piezo-electric device 22. Pulsing this with a 3:10 $\mu$s duty cycle will generate an output signal with significant power at frequencies in excess of about 20 kHz with low power output at lower frequencies—this is advantageous as it has little effect on fish, which might otherwise themselves be deterred from the gill-net, for example.

A problem arises in that active devices that respond to marine mammal stimuli with responses that mimic their sonar will also be sensitive to their own back-scattered emissions, and auto trigger, leading to rapid loss of battery power.

Another problem is that in a series or array of devices, each may trigger its neighbour, which in turn, trigger it, leading, again, effectively to continuous wasteful transmission.

In fact it appears desirable for acoustic devices to trigger others in a ripple effect along the gill-net or around the opening of a trawl, as this will give better orientation information that can be provided by uncorrelated transmissions.

The solution to both problems is to disable the detector 21 for a period of time after an emission is triggered. The length of time for which the detector is disabled will depend on the spacing between the devices in an array—this will usually, at any rate, give a time-out a little longer than required to avoid back-scatter triggering.

To be most effective, it is suggested that the devices facilitate detection when the animal is some distance away—say in the order of 50 m—and emit signals detectable by the animal at a similar distance. Mutual triggering between devices in a array could, therefore occur with a spacing of around 50 m between adjacent devices, but this may well be too far apart to suggest to the animal a solid, impenetrable barrier. Nevertheless, if a device is capable of triggering a similar device 50 m away, the minimum time-out must be the time taken for the sound to travel there and back. As sound travels in water at about 1500 m/sec., the minimum time-out would be about 0.07 seconds plus the duration of the emitted signal. In fact a delay of 1 second is much more than adequate, and permits reactivating of the ripple emission enough times during an animals initial approach to deter it well before it is at risk of collision with the mesh.

It is of some importance that the time-out period on all devices used in an array should be the same to a reasonable degree of tolerance, as the continued approach of the animal after the first ripple firing could trigger a device which had reset before all the others, and a ripple would fail or be spasmodic. On the other hand, it may be found in sea trials that a spasmodic ripple is just as effective as, if not more than, a well coordinated one.

In FIG. 1, the time-out function is effected by a timer operating a switch 25 to disable the detector 21.

Figure 2:
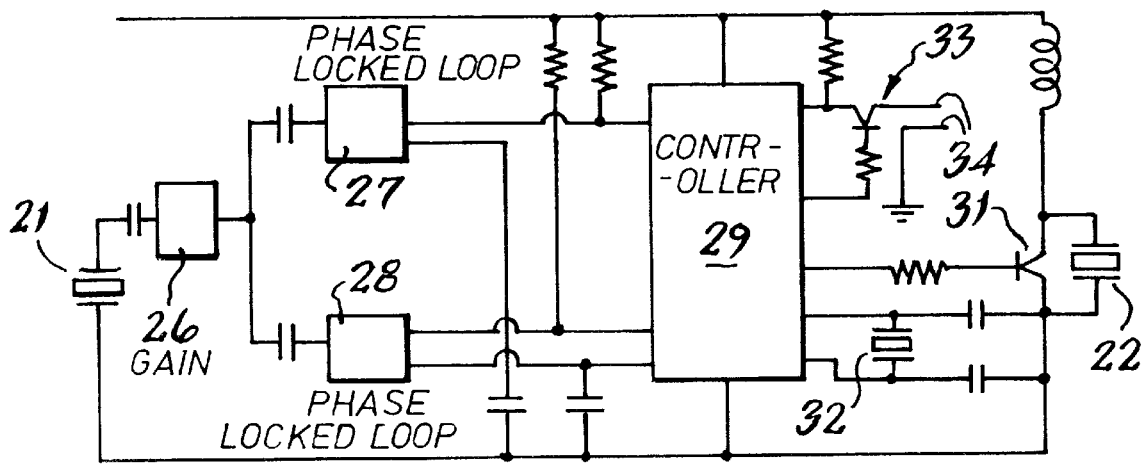
FIG. 2 is a more detailed circuit diagram of the device of FIG. 1.

FIG. 2 shows a detailed circuit design in which the piezo detector 21 is connected to a gain adjusting device 26 which outputs, for any input signal strength over a dynamic range of 50 dB, a constant output signal to the phase locked loop devices 27, 28 having frequencies of 120 and 80 kHz respectively (thus able to detect and discriminate between porpoise and dolphin sonar signals) which input to different terminals of a micro controller chip 29 which may be a PIC 16C56. The chip 29, suitably programmed, responds to an input by firing the output piezo-electric transducer 22 via a transistor 31. A ceramic resonator 32 provides the clock function. The timer 24 and switch 25 are configured within the chip 29.

A water detector 33 comprising external probes 34 is checked, say, every 2.5 seconds for a conductivity signal. So long as water is not detected, the entire device remains in 'sleep' mode with a minimum battery drain—shelf life in this condition can be several years, enabling the device to be completely sealed at manufacture, yet instantly powered up and ready for operation. The water switch 33 eliminates the need for any manual on/off switch, the device being activated on entering the water.

Operational life will depend, of course, on the frequency with which the device is actuated and on the size of the battery pack, but the devices could be constructed inexpensively enough to be regarded as disposable items once exhausted. It is suggested that one km length of gill-net would require some 80 devices although a lower density deployment could be considered if passive reflectors are deployed between these. In critical by-catch areas, or where the associated passive reflectors are not deployed, some overlap between the devices may be desirable which would increase the total number needed.

Being sensitive to different animal sonar frequencies, the device can, of course, emit different deterrent sounds. Devices may be pre-programmed suitably for use in a particular fishery where only one marine mammal species is a problem, or be adaptable for deterring additional species.

A device could even be programmed to detect whether an emission had been successful in deterring a marine mammal approaching it and, if not, try alternative sounds until one worked.

Figure 5:
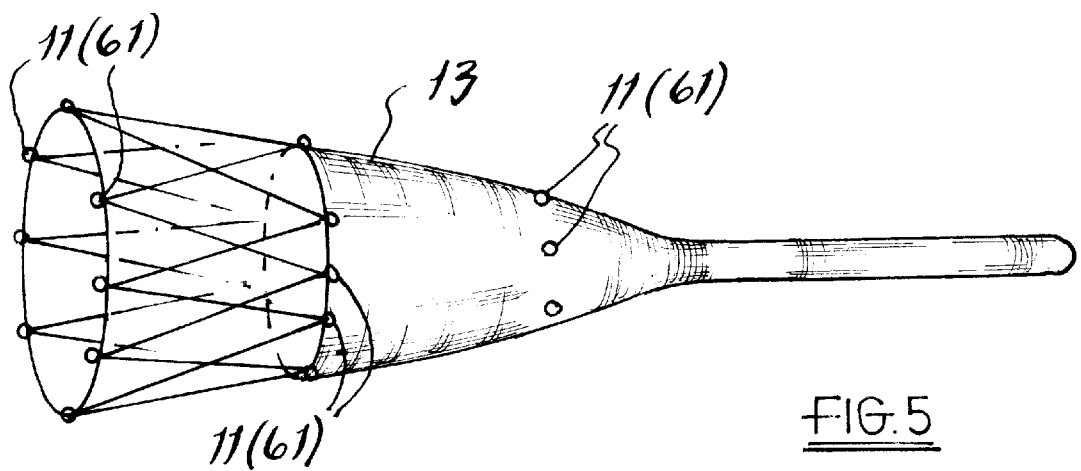
FIG. 5 is a view of a pelagic trawl net showing an array of devices according to FIGS. 1 to 3 delineating the net's boundary behind the opening.

The devices 11 can also be arranged in a series around the opening of a trawl net, as shown in FIG. 5. As the inter-device spacing will be closer on a trawl net than in a gill-net, attention will need to be paid to the time-out on detection in order to avoid continuous mutual interaction. In this situation the near simultaneous activation of all the devices should act to guide the animal back towards the mouth of the net.

Figure 3:
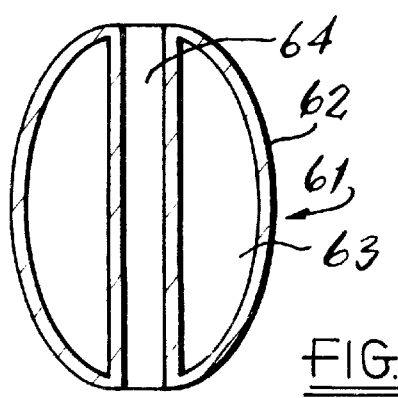
FIG. 3 is a cross-section through a passive acoustic device according to the invention.

Passive devices such as those illustrated in FIG. 3 can, properly deployed, be an effective deterrent. The device 61 is essentially similar to a commercially available deep water net float and comprises an ellipsoidal casing 62 with a central throughway 64, that can incorporate a buoyancy cancelling mass whilst still enabling it to be threaded, long axis vertical, onto a net, and an air chamber 63. Deployed at, say 2 m intervals on a gill-net the devices 61 will reflect sonar emissions back towards the approaching animal. The internal air chamber 63 is tuned to resonate at an audible frequency when stimulated by a sonar impulse and the resulting echoes acquire a low frequency spectral coloration that is different from a fish echo. Passive devices effectively in-fill the acoustically transparent mesh zone between headline and footrope and indicate the position to which this may be displaced from the latter by water movement, these devices complement active devices and, should the latter fail, continue to provide a detectable barrier instead of the 'black hole' that might otherwise encourage penetration.

Figure 4:
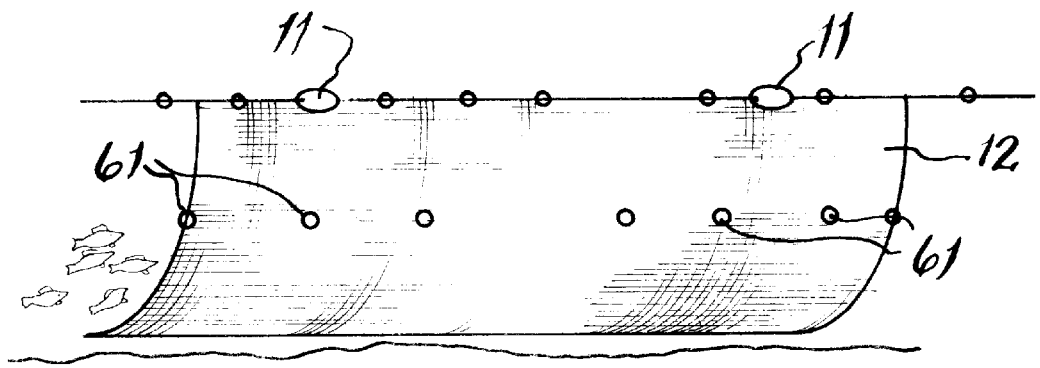
FIG. 4 is an elevation of a bottom set gill-net showing an array of devices according to FIGS. 1 to 3.
Figure 6:
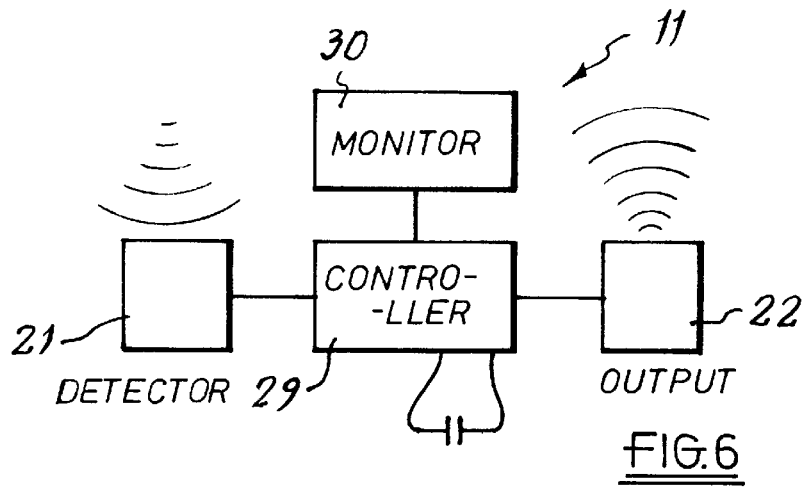
FIG. 6 is a diagrammatic illustration of an acoustic device.
Figure 7:
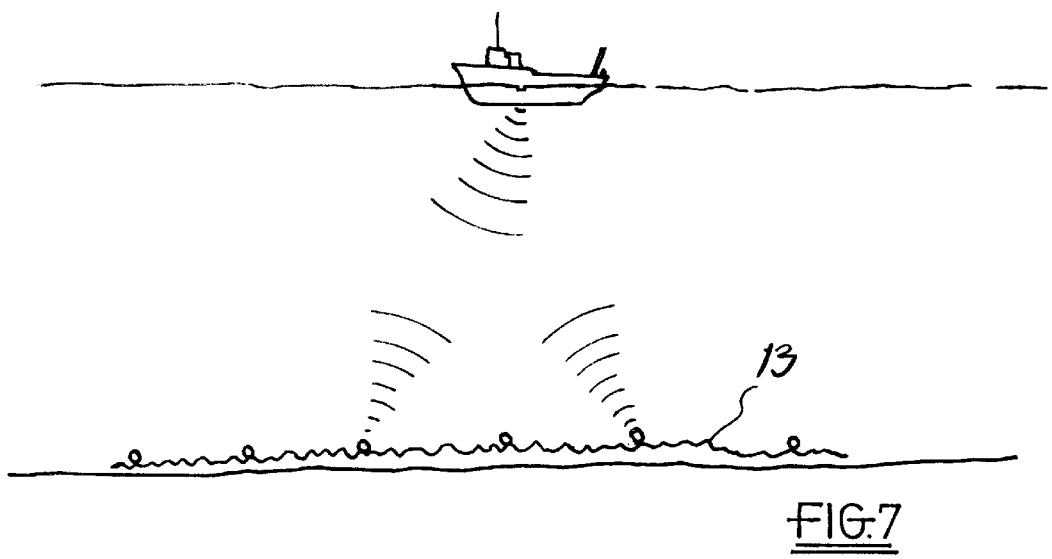
FIG. 7 is a diagrammatic illustration of a lost pelagic trawl being detected by a surface vessel.

FIG. 6 illustrates an acoustic device 11 likewise adapted for attachment to fishing nets 12, 13 (FIGS. 4, 5 and 7 respectively) and comprising a hydrophone detector 21 for detecting acoustic signals and a piezo transducer 22 for emitting acoustic signals, and signal generating means 29 in the form of a microcontroller chip adapted to generate signals for emission by the transducer 22, and control means, also comprised in the signal generating means 29, adapted to cause the transducer to emit signals on detection of a signal by the detector 21.

The signal generating means in the chip 29 are programmable to generate pre-selected signals, and in this embodiment the signal generating means generates Morse Code signals making up a predetermined message, or indeed, several predetermined messages.

One such message can be an identification signal for the boat to which the nets belong. Nets are not infrequently lost and may finish up, as the trawl 13 in FIG. 7, on the seabed. A net equipped with such devices 11 can respond to a triggering signal, which may be a special interrogation signal or which may simply be a deep water echo sounder 'ping', which may be 50 KHz or a 200 KHz tone, the devices 11 being adapted to respond thereto.

Fishing vessels have identification codes, e.g. NL123 for a vessel registered in Newlyn or P2456 for one registered in Penzance. Fishing vessel skippers are proficient in Morse code and will readily identify a net device 11—which respond with a vessel code and be able to locate the net and pass the coordinates to the skipper of the vessel that lost the net. Fisheries regulators might also find this identification feature useful in identifying illegal nets—it could be made an offence to deploy a net without a proper acoustic identification—the possibility of identification of a jettisoned net would militate against illegal nets being deployed with proper identification, and if the identification signal could be heard some distance off (2 Km is not unlikely) it could readily be detected if the net was not identified at all. The devices might be arranged to remain in active mode for a predetermined time—say, three days,—then shut down to passive mode in which they respond to interrogation—this avoids sea bed noise pollution.

Another function that can be accommodated in device 11 is condition, particularly battery, condition monitoring, effected by monitor 30. If the battery voltage is high, the device can be caused to emit an OK signal (e.g. the letter K in Morse code) and if low, an energy saving signal such as the letter E (a single short pulse) at intervals. Other conditions can, of course, be monitored and appropriate coded signals emitted.

An immersion detector 33, which is desirably a capacitative device rather than one which merely detects moisture (so that simply being embedded in wet net in the net pound does not give spurious signals), may condition the emission of signals by the device—e.g. there is no point in transmitting anything (except possibly battery information) when the device is not deployed in the sea.

The device 11 may also, of course, be programmed to identify a marine mammal approaching it and respond with an appropriate alarm or "take notice" signal, or a deterrent signal.

What is claimed is:

1. A method for reducing or avoiding by-catch of marine animals during fishing operations using nets, comprising the step of disposing on or in relation to the nets a series or array of acoustic devices which emit a deterrent signal appropriate to a particular marine animal on actuation by the approach of the animal, at least one of the acoustic devices being an active device that detects marine animal emitted stimuli and responds with a suitable response emission.

2. A method according to claim 1, in which the acoustic devices are arranged so as not to be triggered by their own back-scattered emission.

3. A method according to claim 1, in which the acoustic devices are arranged each to trigger an adjacent device to produce a ripple-effect response to a detected marine animal stimulus.

4. A method according to claim 1, in which the response emission includes acoustic emissions at different frequencies.

5. A method according to claim 1, in which the response emission includes acoustic emissions of different frequencies emitted at different times during a single emission period.

6. A method according to claim 1, in which the response emission includes acoustic emissions at different frequencies, said different frequencies being emitted at the same time.

7. A method according to claim 1, in which different response emissions are emitted depending on the detected marine animal stimuli.

8. A method according to claim 1, in which the devices emit different response from a set of stored responses to detected marine animal stimuli.

9. A method according to claim 1, in which the devices emit different responses from a set of stored responses to detected marine animal stimuli, the devices emitting more than one response selected from the set in response to a particular marine animal stimulus.

10. A method according to claim 1, in which the devices detect the effect of response emissions and vary the emissions so as to improve or optimise their effect.

11. A method according to claim 1, in which the devices detect the effect of response emissions and vary the emissions so as to improve or optimize their effect, such that the devices detect the deterrence effect of response emissions by detecting reduction in emitted stimuli and such reduction reinforces selection of particular response emissions that reduce detected stimuli.

12. A method according to claim 1, in which the acoustic devices comprise acoustic reflectors capable of reflecting marine animal acoustic emissions, spaced apart so as to be affected by a reflected emission from an adjacent device.

13. An acoustic device suitable for use in a method according to claim 1, comprising a passive acoustic reflector which reflects signals in water in the range 70–140 KHz, and which is of neutral buoyancy.

14. An acoustic device adapted to be disposed on or in relation to a fishing net for reducing or avoiding by-catch of marine animals during fishing operations using nets, comprising a detector for detecting the approach of a marine animal by detecting marine animal acoustic emitted stimuli, an emitter for emitting a suitable response emission appropriate to a particular marine animal, and actuator means for actuating the emitter on detection of the approach of a marine animal.

15. An acoustic device according to claim 14, in which the emitter is adapted to emit any of a plurality of acoustic signals, and the device further comprises control means which determines which of said plurality of signals is emitted.

16. An acoustic device according to claim 14, in which the emitter is adapted to emit any of a plurality of acoustic signals, the device further comprising memory means storing data representative of said plurality of signals, said control means being operative to retrieve said data from said memory means.

17. An acoustic device according to claim 14, in which the emitter is adapted to emit any of a plurality of acoustic signals, and the device further comprises control means which determines which of said plurality of signals is emitted, said control means being adapted to disable its detector for a prescribed period following cessation of an emission to avoid being triggered to emit by its own back-scattered emission.

18. An acoustic device according to claim 14, of which said detector detects a deterrent signal of a like acoustic device within a given range and causes its device to emit a like deterrent signal whereby in an array of such acoustic devices a ripple-effect emission is produced.

19. An acoustic device according to claim 14, adapted to detect and/or emit signals in the range 70–140 KHz.

20. A series or array of acoustic devices adapted to be disposed on or in relation to a fishing net for reducing or avoiding by-catch of marine animals during fishing operations using nets, comprising a detector for detecting the approach of marine animals by detecting marine animal emitted acoustic signals and a transducer for emitting suitable response acoustic signals, and signal generating means adapted to generate signals for emission by the transducer and control means adapted to cause the transducer to emit signals on detection of a signal by the detector.

21. A device according to claim 20, comprising an immersion detector.

22. A device according to claim 21, in which the immersion detector is a capacitative detector.

23. A device according to claim 21, in which the immersion detector conditions the emission of signals by the device.

24. A device according to claim 20, in which the signal generating means are programmable to generate preselected signals.

25. A device according to claim 20, in which the signal generating means generates Morse code.

26. A device according to claim 20, comprising device condition monitoring means and adapted to emit condition information.

27. A device according to claim 20, adapted to emit on detection of an echo sounder signal.

28. A device according to claim 20, adapted to emit on detection of a coded interrogation signal.

* * * * *